United States Patent [19]

Barnes et al.

[11] Patent Number: 4,473,201

[45] Date of Patent: Sep. 25, 1984

[54] CANOPY-TYPE AIRCRAFT CARGO DOOR AND ACTUATING MECHANISMS

[75] Inventors: Franklin K. Barnes, Redmond; Allan W. Opsahl, Renton, both of Wash.

[73] Assignee: The Boeing Company, Seattle, Wash.

[21] Appl. No.: 451,218

[22] PCT Filed: Oct. 29, 1982

[86] PCT No.: PCT/US82/01534

§ 371 Date: Oct. 29, 1982

§ 102(e) Date: Oct. 29, 1982

[51] Int. Cl.³ .............................................. B64C 1/14
[52] U.S. Cl. .................................. 244/129.5; 49/280; 49/395; 292/216; 292/DIG. 31; 292/48
[58] Field of Search ............... 244/118.1, 118.3, 129.4, 244/129.5, 137 R; 292/216, 304, DIG. 40, DIG. 31, 196, 223, 48, 26, 45, 201; 49/280, 340, 394, 395

[56] References Cited

U.S. PATENT DOCUMENTS

| | | | |
|---|---|---|---|
| 2,748,855 | 6/1956 | Siems et al. | 244/129.5 |
| 3,169,282 | 2/1965 | Godwin | 244/129.5 |
| 3,478,904 | 11/1969 | Courter | 244/137 R |
| 3,718,171 | 2/1973 | Godwin | 244/129.5 |
| 4,042,193 | 8/1977 | Cerne | 244/129.5 |
| 4,125,235 | 11/1978 | Fitzgerald et al. | 244/129.5 |
| 4,176,812 | 12/1979 | Baker | 244/129.5 |
| 4,199,120 | 4/1980 | Bergman et al. | 244/129.5 |
| 4,269,440 | 5/1981 | Gelhard | 292/201 |
| 4,395,000 | 7/1983 | Deviny et al. | 244/129.5 |

Primary Examiner—Galen L. Barefoot
Attorney, Agent, or Firm—Hughes, Barnard & Cassidy

[57] ABSTRACT

Actuating mechanisms (39, 40, 44) for an aircraft door (34) mounted along its upper edge to the body (36) of an aircraft (25) for movement into and out of a door opening (35) in the fuselage (29). The hinge actuating mechanisms (39) include a drive unit (46) and linkage assembly (50, 51) secured to the body (36) with all actuating components (45, 46, 48-51) mounted on the door (34) and positioned so that all actuating components move outwardly and upwardly to points outboard of an above the opening (35) except for actuating links (51) which pass through the upper corners of opening (35), thus defining an esentially unobstructed clearance area for passage of cargo. The latch cam assembly (40) employs a single actuator (90) for pulling door (34) to a fully closed position and for latching/unlatching a plurality of bottom latches (99, 100) and a pair of mid-span latches (42, 109). The mechanism (40) is sequenced to cause the latches (42, 99) to dwell in their unlatched condition while hooks (92) pull the door (34) into its fully closed position. The actuating mechanism (44) is normally biased open by vent door (83) biasing means (84). Essentially all actuating components are mounted on and carried by the door (34) and may be actuated from the exterior of the aircraft (25) by actuation of a master latch/lock control mechanism (56) on the undersurface of the fuselage (29).

15 Claims, 24 Drawing Figures

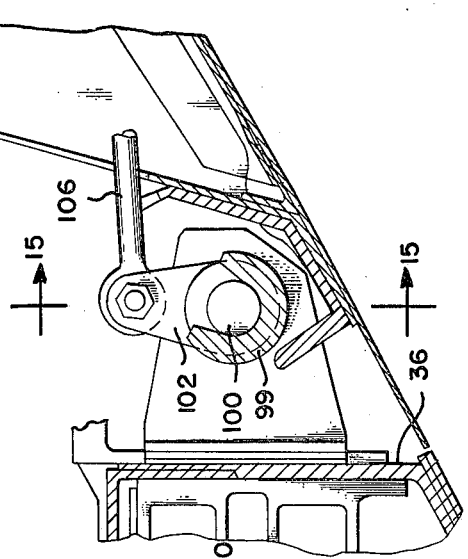
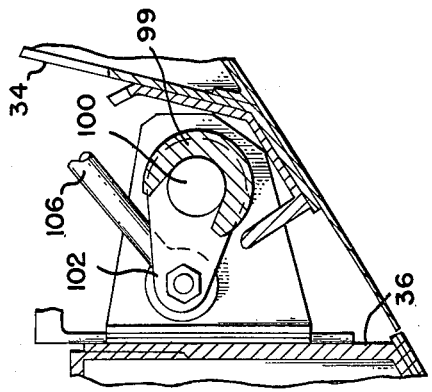
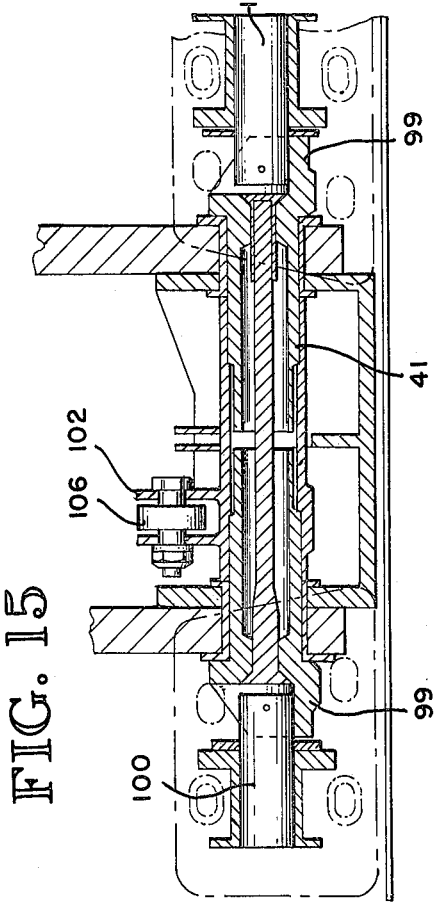
FIG. 14
FIG. 16
FIG. 15

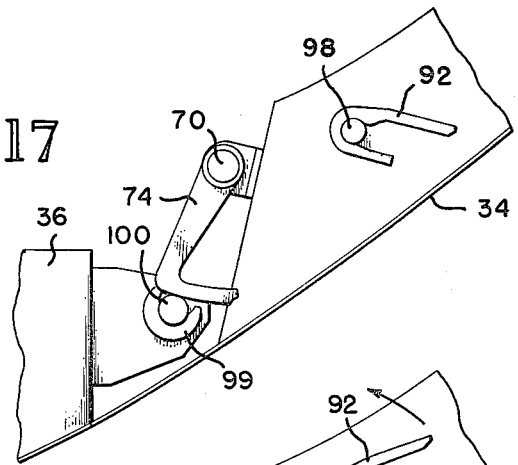
FIG. 17
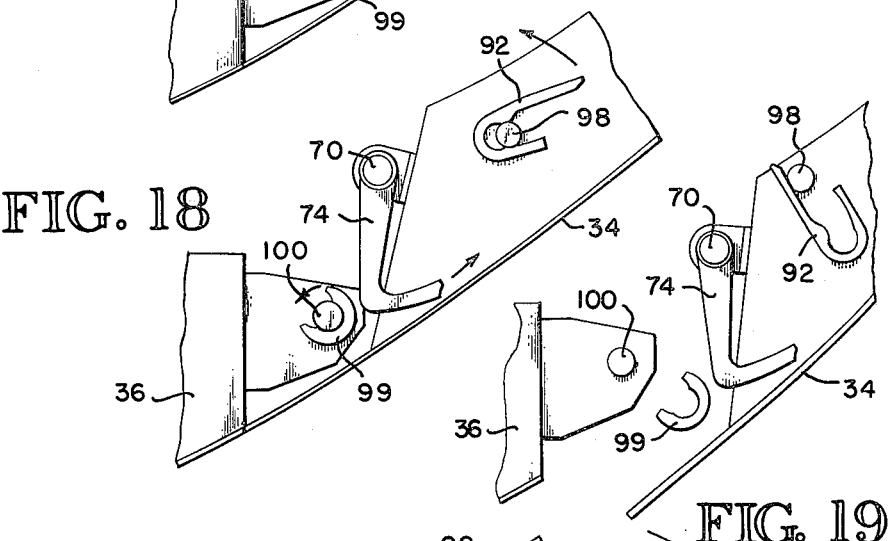
FIG. 18
FIG. 19
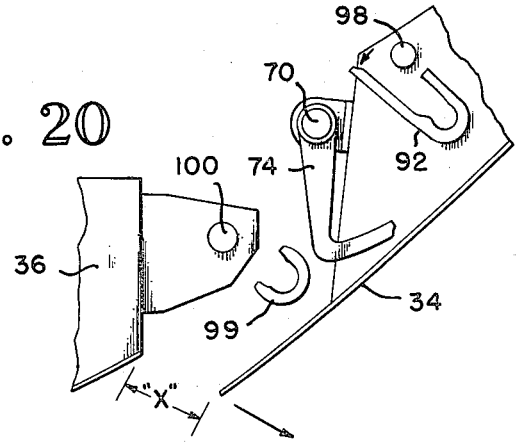
FIG. 20

CANOPY-TYPE AIRCRAFT CARGO DOOR AND ACTUATING MECHANISMS

BACKGROUND OF THE INVENTION

1. Technical Field

The present invention relates generally to canopy-type aircraft cargo doors; and, more particularly, to relatively large cargo doors sized to permit off-loading and on-loading of containerized baggage, containerized and/or palletized cargo, and similar relatively large items including, for example, a palletized aircraft spare engine. In its principal aspects, the invention relates to an electrically operated, outwardly opening, large canopy-type aircraft cargo door and improved actuating mechanisms for: (i) permitting manually operable mechanical locking/unlocking of a fully closed and latched cargo door by ground personnel from the exterior of the aircraft without the need to employ ladders, ramps or similar ground equipment—i.e., the exterior locking/unlocking mechanism is readily accessible to personnel standing on the ground at a terminal gate or the like; (ii) permitting electrically operated latching/unlatching of a fully closed cargo door from the exterior of the aircraft by ground personnel only when the door locking mechanism is unlocked; and (iii), permitting electrically powered opening/closing of the aircraft cargo door only when the door is fully unlocked and unlatched. While the latch/unlatch and door open/close actuating mechanisms are preferably electrically operated as contrasted with the manually operated mechanical locking/unlocking mechanism, provision may be made for permitting manual operation thereof. Moreover, provision may also be made for permitting actuation of all of the actuating mechanisms from the interior of the cargo hold.

In accordance with the invention, the various actuating mechanism are designed and interrelated such that the cargo door is essentially fail-safe—that is, the unlatching and hinge actuating mechanisms can be actuated to open the cargo door only when the door is unlocked and the vent doors are opened to equalize exterior and interior cabin pressure, while the vent doors can be closed and the latch mechanisms locked only when the cargo door is fully closed and the latch mechanisms properly positioned in the fully latched condition.

2. Background Art

Conventional commercial aircraft are commonly provided with a multiplicity of ingress and egress openings in the lower lobe of the aircraft fuselage for permitting on-loading and off-loading of baggage, cargo and the like into and from the cargo hold, and with suitable doors being provided for closure of such openings. The doors vary widely in terms of their construction and operation. However, such cargo doors are commonly electrically powered, outwardly opening, canopy-type doors as contrasted with inwardly opening plug-type doors of the type often used to permit passenger ingress and egress. Such canopy-type cargo doors must be designed such that the interior aircraft cabin can be pressurized only when the doors are fully and properly closed and latched; and, to this end, it has been a common practice to provide relatively small vent doors in the cargo door with the cargo door and vent door actuating mechanisms being so designed and interrelated that closure of the vent doors is precluded in the event that the cargo door is not fully and properly closed and latched, thereby preventing pressurization of the interior compartments of the aircraft. A typical disclosure of such a known approach can be found in U.S. Pat. No. 2,748,855—Siems et al assigned to the assignee of the present invention.

As the aircraft industry has become more highly mechanized and the cargo capacity of relatively large aircraft has increased, it has become commonplace to employ relatively sophisticated cargo/baggage handling systems which enable the on-loading and off-loading of containerized and/or palletized cargo occupying relatively large volumes of space; and, as such cargo handling systems, cargo containers and cargo pallets have increased in size, it has been necessary to increase the size of the cargo ingress/egress openings in the aircraft fuselage and, therefore, to employ relatively large cargo doors to close such openings. And, of course, as the cargo doors have increased in size and weight, the actuating mechanisms for opening/closing, latching/unlatching, and locking/unlocking the doors have become more complex and bulky. In many instances, a significant proportion of such actuating mechanisms are mounted on the fuselage body structure and/or interconnected to the cargo door in such a manner that the actuating mechanisms project through the fuselage ingress/egress opening when the cargo door is opened, thereby significantly decreasing the effective area of the opening and limiting the size of the cargo containers and/or pallets that can be freely passed through such opening. Moreover, as the cargo storage capacity of such aircraft has increased, so too has the size of the ingress/egress openings in the fuselage body structure; and, as a consequence, when the aircraft is fully loaded, resulting distortions in the fuselege body structure tend to produce severe alignment problems when attempting to close the cargo door. Such misalignment often results in jamming of the door latching and/or locking mechanisms.

SUMMARY OF THE INVENTION

An electrically powered, outwardly opening canopy-type cargo door suitable for closing a relatively large cargo ingress/egress opening—for example, an opening extending up to, or even exceeding, on the order of 134 inches in width and/or 69 inches in height—together with suitable actuating mechanisms for permitting locking/unlocking, latching/unlatching and closing/opening of the door are disclosed wherein ground personnel may initiate opening of a fully closed, latched and locked cargo door and/or closure of a fully open door from the exterior of the aircraft without having to employ ladders, ramps or other ground equipment to gain access to the master latch locking mechanism mounted in the exterior skin of the fuselage; and, wherein the cargo door is essentially fail-safe in operation. More specifically, the actuating mechanisms are so designed and interrelated that: (i) the latching mechanisms cannot be actuated until and unless the locking mechanisms have been unlocked and exterior and interior cabin pressures equalized; (ii) the hinge actuating mechanisms cannot be actuated to open the cargo door until the latching mechanisms have been unlatched; and (iii), the latch locking mechanisms cannot be shifted to the latch locked position nor the vent doors closed to permit interior cabin pressurization unless and until the cargo door is fully and properly closed and latched. While the foregoing door actuating mechanisms have been designed to permit ready access from ground based personnel exterior of the aircraft, the actuating mechanisms can also be activated from within the cargo area. Similarly, while the latch actuating mechanisms and hinge actuating mechanisms are preferably electrically powered, they may be manually operated should the need arise. The locking mechanism, on the other hand, is designed such that it requires deliberate manual operation to either lock or unlock the cargo door.

More specifically, it is a general aim of the present invention to provide an outwardly opening canopy-type cargo door and actuating mechanisms therefor which are particularly advantageous for use in closing essentially uninterrupted large area cargo ingress/egress openings formed in an aircraft fuselage—e.g., openings which may extend up to, or even exceed, on the order of 134 inches clearance in uninterrupted width and/or 69 inches clearance in height—and which employ three separate independent, but interrelated actuating mechanisms—viz., (i) an external manually operable mechanical locking/unlocking mechanism readily accessible to ground personnel and which can be manually shifted to the locked position only when the cargo door is fully and properly closed and latched; (ii) an externally energizable electrically powered door latching/unlatching mechanism which is readily accessible to ground personnel only when the locking/unlocking mechanism is unlocked and which functions not only to latch and/or unlatch a fully closed cargo door but, additionally, to initiate the final increment of pivotal door closing movement during a latching operation and the initial increment of pivotal door opening movement during an unlatching operation; and (iii), an electrically powered hinge actuating mechanism for opening and closing the cargo door which is enabled only when the door is fully unlocked, unlatched, and at least partially open. As a result of attaining these objectives, the relatively large canopy-type cargo door of the present invention is essentially fail-safe in operation.

It is an important objective of the present invention to provide a relatively large canopy-type cargo door of the foregoing character wherein essentially all of the actuating and operating mechanisms (except for the externally accessible fuselage-mounted master latch lock control handle and electrical switches) are mounted on the interior surface of the cargo door and positioned so as to be almost entirely outside of the constraining edges of the ingress/egress opening in the fuselage when the cargo door is fully open, thereby maximizing the size of the ingress/egress opening and permitting passage of containerized and/or palletized cargo having widths and/or heights extending up to the effective width and/or height of the door opening.

One of the more detailed objectives of the invention is the provision of a single electro-mechanical actuator for actuating, in proper sequence, both the multiplicity of door latches and the door pull-in/push-out mechanisms, thereby reducing weight of the operating components and enhancing system reliability.

In yet another of its more detailed objectives, the improved externally accessible and manually operable locking/unlocking mechanism is interrelated to the vent doors and latching mechanisms in such a manner that the biasing means employed to normally bias the vent doors to the open position serves to unlock the latching means and to pivot the externally mounted master latch lock control handle to the open position exposing the electrical switch actuators for access by ground personnel when the normally latched handle is manually released by such personnel; yet, wherein such ground personnel cannot shift the master latch lock control handle to the closed and locked position and, hence, cannot close the vent doors against their opening bias to permit cabin pressurization unless and until the cargo door is fully and properly closed and latched—that is, in the event of jamming of the door and/or latch means in a partially open or unlatched position, the mechanical latch locking segments are precluded from moving into their latch locking position, thereby precluding pivotal movement of the master control lever which is mechanically connected thereto. In this connection, a load limiter is provided in the master control handle assembly for preventing ground personnel from shifting the handle to a closed position in the event of a jam or other malfunction of the door latching system.

DESCRIPTION OF THE DRAWINGS

These and other objects and advantages of the present invention will become more readily apparent upon reading the following detailed description and upon reference to the attached drawings, in which:

FIG. 14 is a sectional view taken substantially along the line 14—14 in FIG. 13, but with parts removed for purposes of clarity, and here illustrating one of the door latching mechanisms in the fully latched position;

FIG. 15 is a sectional view taken substantially along the line 15—15 in FIG. 14 and illustrating one of the door latching mechanisms in somewhat greater detail;

FIG. 16 is a sectional view similar to FIG. 14, but here illustrating the latching mechanism in the unlocked and unlatched position;

FIG. 17 is a diagrammatic sectional view of portions of the door pull-in/push-out, latching, and locking mechanisms here depicting the cargo door in the fully closed, latched, and locked position;

FIG. 18 is a diagrammatic sectional view similar to FIG. 17, but here illustrating the latching assembly in the unlocked position and the door pull-in/push-out and latching mechanisms in the initial stages of a door unlatching operation;

FIG. 19 is a diagrammatic sectional view similar to FIGS. 17 and 18, but here illustrating the relative positions of the door pull-in/push-out, latching and locking elements in the final stages of a door unlatching operation;

FIG. 20 is a diagrammatic sectional view similar to FIG. 19, but here illustrating the door pull-in/push-out, latching and locking elements in the position occupied when the cargo door is fully unlatched—i.e., a position wherein the cargo door is slightly ajar and in the position occupied at the instant that the hinge actuating mechanism is either first energized to initiate a door opening operation or de-energized during a door closing operation;

Figure 1:
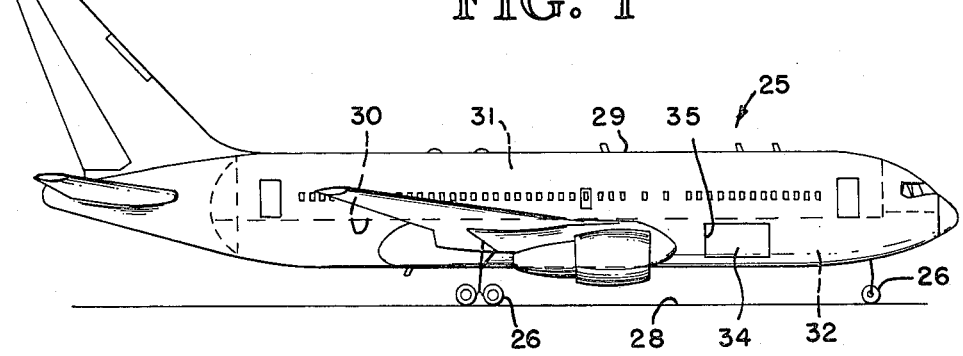
FIG. 1 is a side elevational view of the right or starboard side of a large capacity passenger aircraft and illustrating particularly the location of a relatively large cargo door embodying features of the present invention with such door here providing access to the forward cargo hold disposed in the lower lobe of the aircraft fuselage.

While the invention is susceptible of various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents and alternatives falling within the spirit and scope of the invention as expressed in the appended claims.

DETAILED DESCRIPTION

Environment of the Invention

Referring first to FIG. 1, there has been illustrated a conventional large capacity commercial passenger aircraft, generally indicated at 25, here shown as supported by landing gear 26 on the ground 28 at, for example, a terminal gate located at any conventional airport terminal building (not shown). As is common with this type of aircraft, the fuselage 29 is divided by a transverse horizontal deck 30 into an upper lobe 31 defining the passenger cabin, cockpit, galleys, lavatories and storage areas for carry-on luggage; and, a lower lobe 32 defining the forward and aft cargo holds, a bulk cargo hold, and other necessary equipment and facility areas. In the exemplary aircraft 25, access to the forward cargo hold is provided by a relatively large cargo door 34 embodying features of the present invention, with the door here being positioned within an ingress/egress opening 35 formed in the right or starboard wall of the fuselage 29 in the region of the forward cargo hold. As the ensuing description proceeds, those skilled in the art will appreciate that the particular location and size of the exemplary cargo door 34 is not critical to the present invention. Thus, the exemplary door and related actuating mechanisms embodying the present invention can be located in the forward cargo area as shown, in the aft cargo area, in both cargo areas, or, for that matter, on either or both of the port or starboard sides of the fuselage 29. Moreover, while the actuating mechanisms of the present invention find particularly advantageous use in connection with relatively large cargo hold ingress/egress openings 35—in the exemplary aircraft 25, the opening 35 defines an unobstructed clearance space on the order of 134 inches in width and 69 inches in height—those skilled in the art will appreciate that the various actuating mechanisms described will find equally advantageous use with canopy-type doors that are larger and/or smaller in either or both width and/or height.

As best illustrated by reference to FIGS. 2, 3, 5 and 8 conjointly, it will be observed that the exemplary cargo door 34 of the present invention is an outwardly opening canopy-type door of generally conventional frame/stiffener/skin construction and adapted to be pivotally connected to the fuselage body structure 36 along the mating upper horizontal edge of the door 34 and that portion of the body structure 36 defining the upper horizontal edge of the ingress/egress opening 35 by means of a piano-type hinge 38 (best shown in FIGS. 3 and 8) secured to the door 34 and body structure 36.

Figure 2:
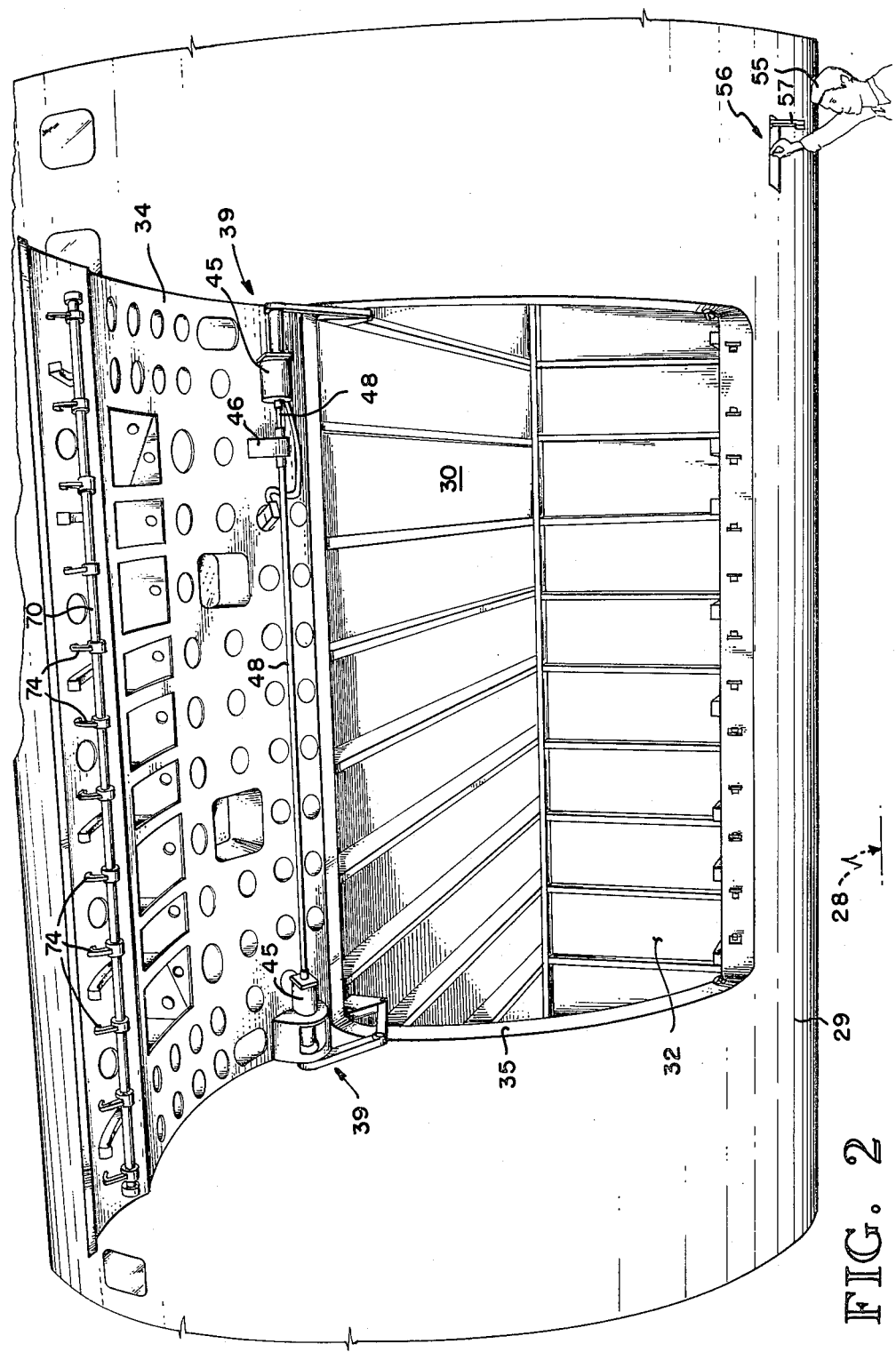
FIG. 2 is an enlarged fragmentary side elevational view here particuarly illustrating the forward cargo hold door of the present invention in the fully open position and, illustrating also, the location of the manually operable, externally mounted latch/lock mechanism which is located on the lower portion of the aircraft fuselage in position to permit ready access by ground personnel for the purpose of initiating cargo door opening and/or closing operations.

To permit opening and closing movement of the door 34—i.e., movement between a first fully opened position as shown in FIG. 2 and a second position wherein the door 34 is slightly ajar adjacent its lower edge (a position not shown in detail in FIGS. 3–5, but hereinafter described in detail in connection with a door opening and closing operation more fully illustrated in FIGS. 17–20)—a pair of identical hinge actuating mechanisms, generally indicated at 39 in FIGS. 2–6 and 8, are mounted on and carried by the door 34 adjacent the inner forward and aft upper edge thereof. When fully closed, the door 34 is latched in place by means of a latch cam assembly, generally indicated at 40 in FIGS. 3, 4 and 8, defining a multiplicity of door latches 41 disposed along and carried by the bottom edge of the door 34 and at least one pair of mid-span door latches 42 mounted on the forward and aft vertical edges of the door. The door 34, when fully closed and latched, is adapted to be locked in place in its fully closed latched position by means of a manually operable latch/lock assembly, generally indicated at 44 in FIGS. 3, 4 and 8.

Hinge Actuating Mechanisms 39

Turning now to FIGS. 3–6 and 8 conjointly, the hinge actuating mechanisms 39 for pivoting the canopy-type door 34 about the piano-type hinge 38 between a first position where the door is fully opened (See, FIG. 2; See, also, FIG. 5 phantom line position) and a second position (not shown in detail) where the door is slightly ajar along its lower edge defining a gap on the order of about 2.5 inches between the bottom edge of the door and the sill of the ingress/egress opening 35, will now be described. As the ensuing description proceeds, those skilled in the art will appreciate that the hinge actuating mechanisms 39 are generally of conventional construction except for the fact that all operational components thereof are fixed to and carried by the inboard upper edge of the door 34 and positioned so that the ingress/egress opening 35 is essentially unobstructed when the door 34 is fully opened, as best illustrated in FIG. 2.

Thus, in keeping with the present invention, the exemplary hinge actuating mechanisms 39 each include a rotary actuator 45 coupled to a conventional power drive unit 46 by means of torque tubes 48. Actuators 45 preferably comprise conventional gear reduction units employing three planetary gear stages (not shown) capable of providing a gear reduction of 250:1 with output torque being transmitted via a short output shaft 49 to a lift drive linkage assembly (best shown in FIGS. 5, 6 and 8) comprising a drive arm 50 drivingly coupled at one end to the rotary actuator output shaft 49 and pivotally connected at its opposite end to one end of a link 51. The opposite end of link 51 is, in turn, pivotally connected at 52 to the fuselage body structure 36. A conventional limit switch 54 mounted on the inboard upper edge of the cargo door 34 is positioned so as to be engageable by the hinge drive arm 50 when the cargo door 34 is in its fully open position (as best shown in FIG. 6), thus defining an overtravel stop effective to de-energize the power drive unit 46 (FIGS. 2–4) when the door 34 reaches its fully open position.

Thus, the arrangement is such that when the cargo door 34 is unlocked, fully unlatched, and in a slightly ajar position, energization of the power drive unit 46 serves to transmit torque via torque tubes 48 to the fore and aft rotary actuators 45 and thence via output shafts 49 to the fore and aft lift drive linkage assemblies 50, 51, causing the canopy-type door 34 to be pivoted outwardly and upwardly (i.e., in a counterclockwise direction as viewed in FIGS. 5 and 6) about the piano-type hinge 38 towards the fully opened position. At that fully opened position, actuation of the limit switch 54 serves to de-energize the power drive unit 46. The cargo door 34 remains open until a door closing cycle of operation is initiated, at which time the power drive unit 46 is again energized to drive the fore and aft lift drive linkage assemblies 50, 51 in the opposite direction (i.e., clockwise as viewed in FIGS. 5 and 6) towards a door closed position. A conventional limit switch (not shown) is provided for de-energizing the power drive unit 46 when the cargo door 34 reaches a second position in which the door, although substantially closed, is slightly ajar defining a gap of about 2.5 inches between the lower door edge and the horizontal sill formed by the fuselage body structure 36 at the bottom of ingress/egress opening 35.

Figure 5:
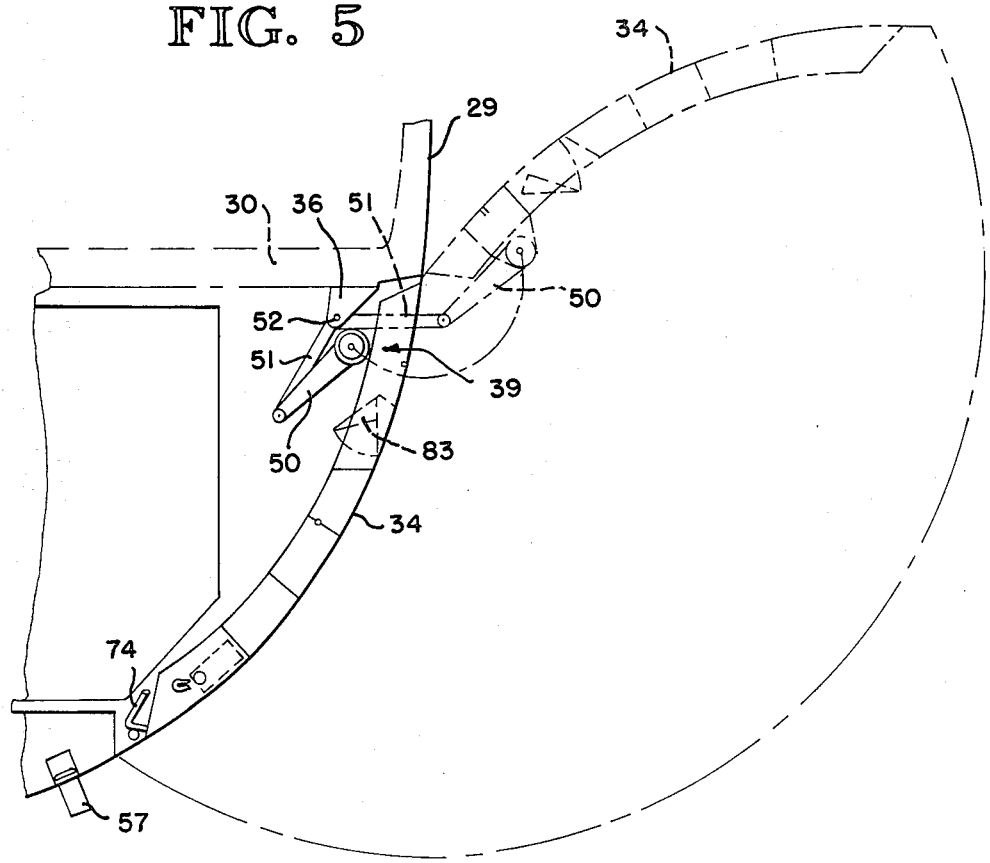
FIG. 5 is a diagrammatic sectional view taken substantially along the line 5—5 in FIG. 4, here illustrating the cargo door of the present invention in a solid line fully closed, latched and locked position and in phantom lines in the fully open position.
Figure 6:
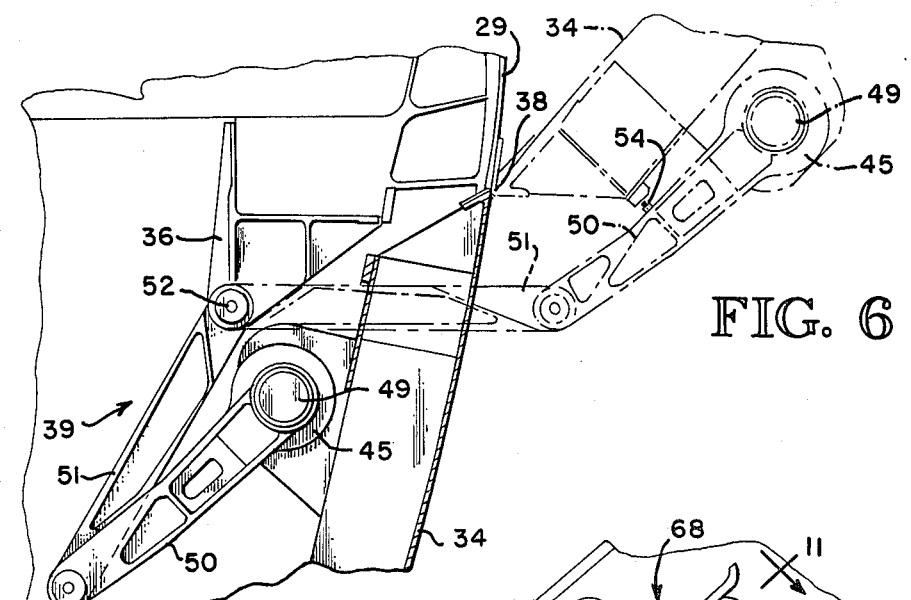
FIG. 6 is an enlarged sectional view of a portion of the door actuating mechanism depicted in FIG. 5 and here illustrating particularly details of the hinge actuating mechanism for opening and closing the cargo door.

Thus, as most clearly illustrated in FIG. 2 and to a lesser extent in FIG. 5, it will be appreciated that the mounting of all hinge actuating components on the inner upper edge of the cargo door 34 results in an arrangement wherein all of such components move with the door to a position above the ingress/egress opening 35 in the aircraft fuselage 29 when the door is fully opened, thus defining a cargo ingress/egress opening 35 which is essentially unobstructed except for the lift drive linkage assemblies 50, 51 which extend through the upper fore and aft corners of opening 35.

Latch/Lock Mechanism 44

In carrying out one of the principal aspects of the present invention, provision is made for permitting unlocking of a fully closed and latched cargo door 34 and subsequent initiation of a door opening cycle from the exterior of the aircraft 25 by ground personnel such as the ground crew member 55 shown in FIG. 2, all without the need for ladders, ramps or other ground equipment. To this end, the latch/lock mechanism 44 (as best shown by reference to FIGS. 3 and 7 through 12 conjointly) includes a master latch/lock control handle assembly, generally indicated at 56, mounted on the exterior of the fuselage body structure 36 slightly forward of the cargo door 34 and below the bottom door edge where the control handle assembly 56 is positioned about 6.5 feet above ground level 28, thus permitting ease of access to the control handle assembly 56 by a ground crew member 55 without the need for ladders, ramps, or any other type of ground equipment.

In keeping with this aspect of the invention, the exemplary master latch/lock control handle assembly 56 includes a handle 57 (best shown in FIGS. 2, 7 and 9) which is normally spring biased to an open position, but releasably latched in a closed position flush with the fuselage exterior skin surface by means of a spring biased handle release catch 58 (FIG. 7) pivoted to the fuselage body structure 36 at 59 and cooperable with a latch pin 60 formed on the handle 57. Thus, the arrangement is such that when the ground crew member 55 wishes to unlock the cargo door 34 preparatory to initiating a door opening cycle of operation, it is merely necessary for such ground crew member to depress the release catch 58 in the master latch/lock control handle assembly 56 which is disposed on the under surface of the aircraft fuselage 29 so as to pivot the handle release catch 58 about its pivot point 59 (in a clockwise direction as viewed in FIG. 7), thereby releasing control handle 57 and allowing such handle to be pivoted (in a counterclockwise direction as viewed in FIG. 7) about its pivotal connection 61 to the fuselage body structure 36 by means of a biasing mechanism to be described hereinbelow. When handle 57 is pivoted to its fully open position, a plurality of electrical control switches, generally indicated at 62 in FIG. 7, housed within the master latch/lock control handle assembly 56 are exposed and become accessible to ground personnel for initiating door unlatching/latching and opening/closing operational cycles.

Figure 7:
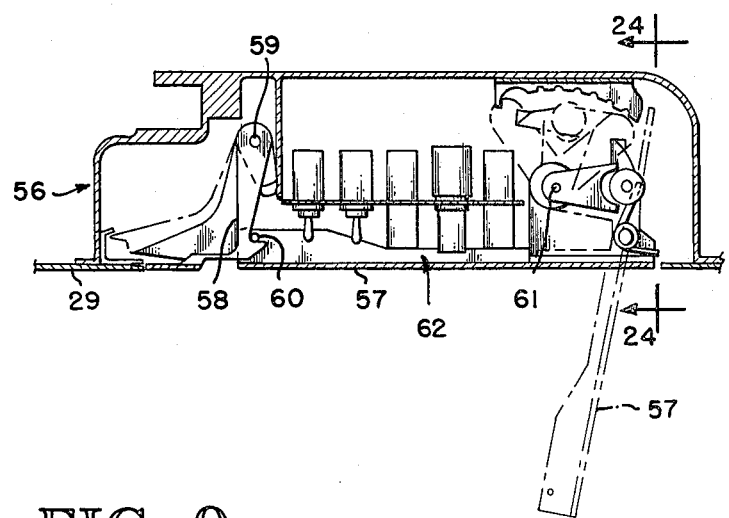
FIG. 7 is a fragmentary sectional view of the fuselage mounted master latch/lock control mechanism for enabling actuation of the cargo door from the exterior of the aircraft by a member of the ground crew, and here illustrating the handle in the solid line closed and fully locked position and in phantom lines in the open position permitting access to the electrical door actuating switches.

In order to normally bias the control handle 57 to its fully open position—i.e., the phantom line position shown in FIG. 7—the handle is coupled via a series of connecting rods 63, 64 and bell cranks 65, 66 to a body-mounted torque tube 67 forming part of a fuselage body structure/door interconnect mechanism, generally indicated at 68 (as best shown in FIGS. 3, 7 and 9–11), to a coaxial torque tube 69 mounted on and carried by the cargo door 34. Torque tube 69 is, in turn, drivingly coupled to a transversely extending door-mounted latch/lock torque tube 70 by means of a connecting rod 71 and cranks 72, 73 respectively mounted on the torque tubes 69, 70.

The examplary latch/lock torque tube 70 here performs two important functions—viz., (i) it serves to support and rotationally drive a plurality of cam latch lock segments 74 (best shown in FIGS. 3, 8 and 9); and (ii), it serves to transmit rotational torque to a vent door torque tube 75 via a series of connecting rods 76–78 and bell cranks 79–82 (best shown in FIGS. 9 and 12) with all of the foregoing components being mounted on the inboard side of the cargo door 34. As will be readily understood by those skilled in the art, a plurality of vent doors 83 (there being two such doors 83 in the exemplary construction) are provided for enabling pressurization of the interior aircraft cabin compartments during in-flight operations while, at the same time, permitting equalization of interior cabin pressure and exterior pressure preparatory to opening of the cargo door 34.

Figure 9:
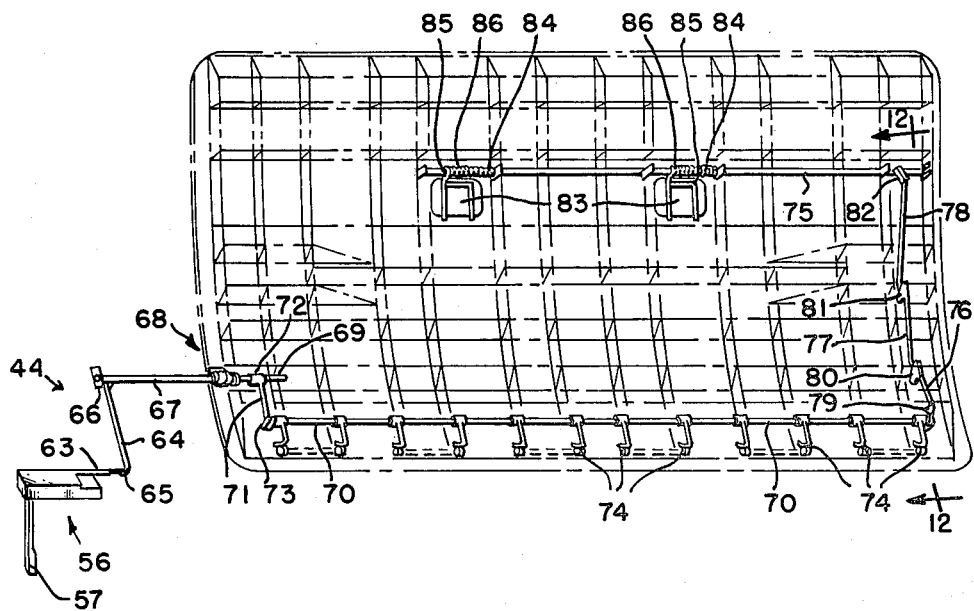
FIG. 9 is an interior, highly diagrammatic, perspective view of portions of the cargo door actuating mechanisms, with parts removed for purposes of clarity, and illustrating particularly those portions of the door actuating mechanisms associated with the master latch/lock and vent door operating mechanisms.
Figure 12:
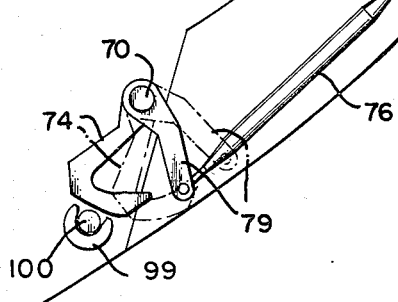
FIG. 12 is a sectional view taken substantially along the line 12—12 in FIG. 9 and illustrating particularly details of the actuating linkages associated with the latch/lock and vent door operating mechanisms.

As best shown by reference to FIGS. 9 and 12 conjointly, the vent doors 83 are drivingly coupled to the vent door torque tube 75 by means of master latch/lock torsion springs 84 which are wound about the vent door torque tube 75 and which are secured at one end to the cargo door 34 and at the other end to pawls or cranks 85 rotatably mounted on the torque tube 75. Thus, The arrangement is such that the torsion springs 84 (FIG. 9) are unwound when the vent doors 83 are in the open dotted line position shown in FIG. 12, and are wound to provide a torsional biasing force when the vent doors 83 are closed. As a consequence, when the vent doors 83 are in the solid line closed position shown in FIG. 12, a rotational biasing force is applied to the master latch/lock control handle 57 by the wound torsion springs 84 via vent door torque tube 75, connecting rods 76–78 and bell cranks 79–82 (FIGS. 9 and 12), latch/lock torque tube 70, connecting rod 71 and cranks 72, 73, torque tubes 67, 69 and their associated interconnect assembly 68, and connecting rods 63, 64 and bell cranks 65, 66. Therefore, when the ground crew member (FIG. 2) depresses the handle release catch 58 (FIG. 7), the spring bias provided by the master latch/lock torsion springs 84 serves to pivot the now released master latch/lock handle 57 in a counterclockwise direction as viewed in FIG. 7 so as to expose and provide ready access of the enclosed door actuating switches 62. Moreover, at the same time as the master latch/lock control handle 57 is pivoted to its open position indicated in dotted lines in FIG. 7, the torsion springs 84 serve: (i) to open the vent doors 83, thereby equalizing exterior and interior cabin pressure; and (ii), to drive the latch/lock torque tube 70 in a counterclockwise direction as viewed in FIG. 12 so as to pivot the multiplicity of cam latch lock segments 74 in a counterclockwise direction to an "unlock" position wherein the locking segments do not serve to impede actuation of the latch cam assembly 40.

In carrying out this aspect of the invention, a second pair of torsion springs 86 (FIG. 9) are wound about the vent door torque tube 72 and are associated with each of the vent doors 83—one end of each torsion spring 86 being secured to the vent door 83 and the opposite end secured to the torque tube pawls or cranks 85. Thus, the second torsion springs 86 serve to provide a biasing force for normally urging the vent doors into a closed position during normal in-flight operations, yet permit opening of the vent doors 82 without actuation of the latch/lock mechanism 44 in the event of negative interior cabin pressures.

Figure 10:
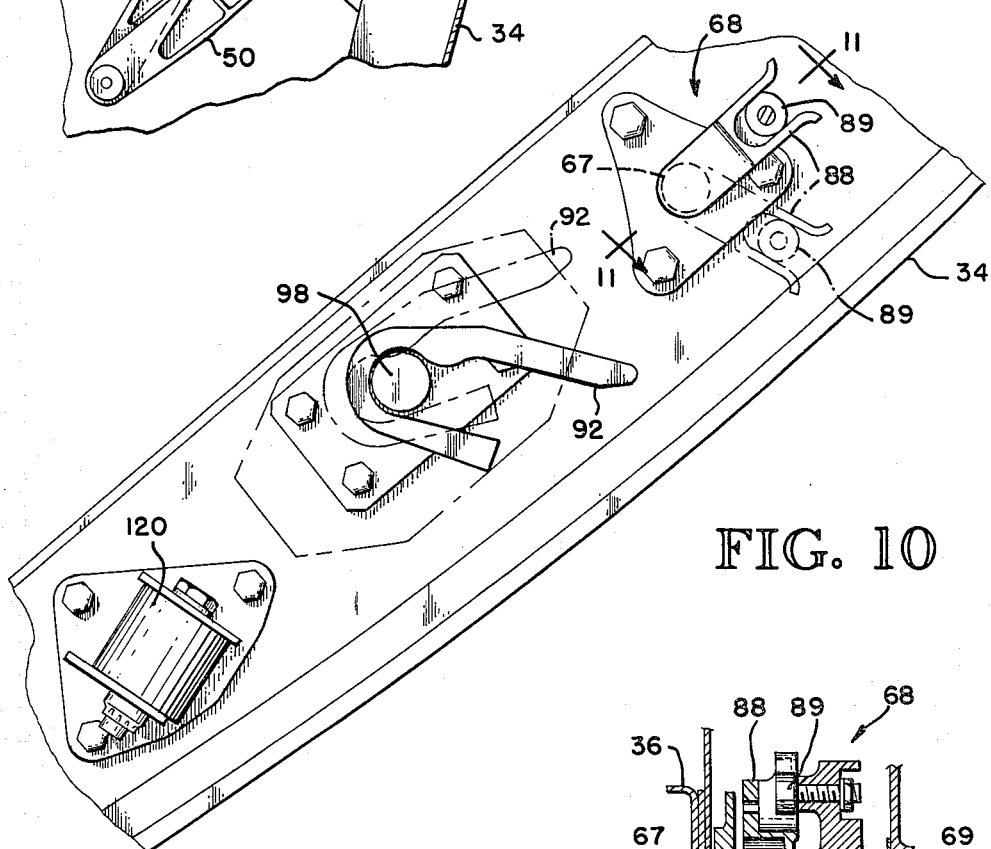
FIG. 10 is a sectional view taken substantially along the line 10—10 in FIG. 4 and here illustrating details of the door pull-in/push-out mechanism and the interconnect mechanism employed for separably interconnecting the fuselage-mounted actuating handle with the door-mounted latch locking and vent door operating mechanisms.
Figure 11:
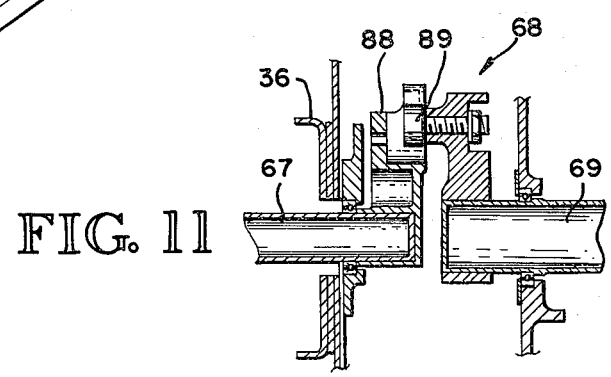
FIG. 11 is a sectional view taken substantially along the line 11—11 in FIG. 10 and illustrating particularly details of the interconnect mechanism in the latch/lock actuating linkage for permitting coupling of the door-mounted and fuselage-mounted portions of the drive linkage when the cargo door is closed and uncoupling thereof when the door is opened.

A more detailed understanding of the fuselage body structure/door interconnect mechanism 68 will be facilitated by the ensuing description with particular reference to FIGS. 9 through 11, conjointly. Thus, as here illustrated, it will be noted that the interconnect mechanism 68 includes a fishmouth-type connector element 88 pivotally mounted on the fuselage body structure adjacent the forward vertical edge of the ingress/egress opening 35, with such element 88 being drivingly coupled to the body-mounted torque tube 67 comprising a portion of the master latch/lock mechanism 44. As shown in the phantom line position in FIG. 10, fishmouth-type connector element 88 is positioned to receive and capture a roller 89 projecting laterally from the adjacent vertical edge of the cargo door 34 when the door is moved into a fully closed position. Roller 89 is secured to and carried by torque tube 69 mounted on the cargo door. The arrangement is such that when the cargo door 34 is moved to the fully closed position shown in FIG. 10, roller 89 is received within the fishmouth-type connector element 88 and establishes a rotational drive connection between the coaxial body-mounted torque tube 67 and the door-mounted torque tube 69.

In operation, when the ground crew member 55 (FIG. 2) wishes to lock the fully closed and latched cargo door 34, it is merely necessary to pivot the master latch/lock handle 57 from the dotted line open position shown in FIG. 7 to the solid line closed position flush with the exterior skin surface on the aircraft fuselage 29—i.e., in a clockwise direction as viewed in FIG. 7. Such pivotal movement serves to drive the body-mounted torque tube 67 in a counterclockwise direction as viewed in FIG. 10, pivoting the fishmouth-type connector element 88 in a counterclockwise direction to the solid line position shown and transmitting rotational torque to the door-mounted torque tube 69. When the master latch/lock connector handle 57 is pivoted into the flush stowed solid line position shown in FIG. 7, the handle latch pin 60 engages the handle release catch 58, camming the latter in a clockwise direction as viewed in the drawing and against its normal spring bias, with the release catch thereafter being pivoted in a counterclockwise direction by its normal spring bias so as to again engage and capture the handle latch pin 60 for holding the master latch/lock connector mechanism 44 in a locked state against the biasing forces exerted by the vent door torsion springs 84 which have been wound about the vent door torque tube 75 during the door locking operation.

In like manner, when the cargo door 34 is again unlocked by external activation of the handle release catch 58, the rotational bias provided by the wound torsion springs 84 serves to pivot the latch/lock control handle 57 outwardly to the open position in the manner previously described; and, during this operational mode, torque is transmitted via the latch/lock torque tube 70, control rod 71 and bell cranks 72, 73, to the door-mounted torque tube 69, thus causing the roller 89 carried thereby to pivot the fishmouth-type connector element 88 in a clockwise direction as viewed in FIG. 10 from the solid line locked position shown in the phantom line unlocked position there shown. Such pivotal movement of the fishmouth-type connector element 88 transmits torque to the body-mounted torque tube 67 and thence to the master latch/lock control handle 57 in the manner previously described. When in the unlocked position shown in phantom lines in FIG. 10, the roller 89 carried by the door-mounted torque tube 69 is free to move out of the fishmouth-type connector element 88 during outward pivotal movement of the cargo door 34.

Latch Cam Assembly 40

Having in mind an understanding of the construction and mode of operation of: (i) the hinge actuating mechanisms 39 for opening and closing the cargo door 34; and (ii), the latch/lock mechanism 44 for locking and/or unlocking the cargo door 34 when it is in a fully closed latched condition, the construction and operation of the latch cam assembly 40 will now be described with reference initially to FIGS. 3, 7, 8, 10, 13–16 and 21 conjointly; and, thereafter, with reference to FIGS. 17 through 20 which are highly simplified drawings illustrating the various stages of the cargo door locking/unlocking, latching/unlatching and closing/opening actuating mechanisms.

In accordance with one of the important aspects of the present invention, a door-mounted latch cam assembly 40 (FIGS. 3, 8 and 13) is provided which serves two important functions—viz., (i) to pull in the partially open cargo door 35 during the final increment of door closing movement to a fully closed position when the hinge actuating mechanism 39 hereinabove described has pivoted the cargo door 34 from a fully open position to a substantially closed position—and, conversely, to push open the door 34 from a fully closed position to a slightly ajar position during the initial increment of door opening movement preparatory to energization of the hinge actuating mechanisms 39—and (ii), to latch and/or unlatch a fully closed cargo door 34 preparatory to a door-locking or door-opening operation, respectively. To accomplish this, the exemplary door-mounted latch cam assembly 40 of the present invention includes a single electrically powered latch and hook actuator 90 mounted on the lower inboard central portion of the cargo door 34 and which is adapted to be energized by a ground crew member (e.g., the ground crew member 55 shown in FIG. 2) who merely actuates an appropriate one of the "unlatch/open door" or "close door/latch" electrical switches 62 (FIG. 7) from the exterior of the aircraft 25 to energize the latch and hook actuator 90 for operation in the appropriate mode.

Figure 8:
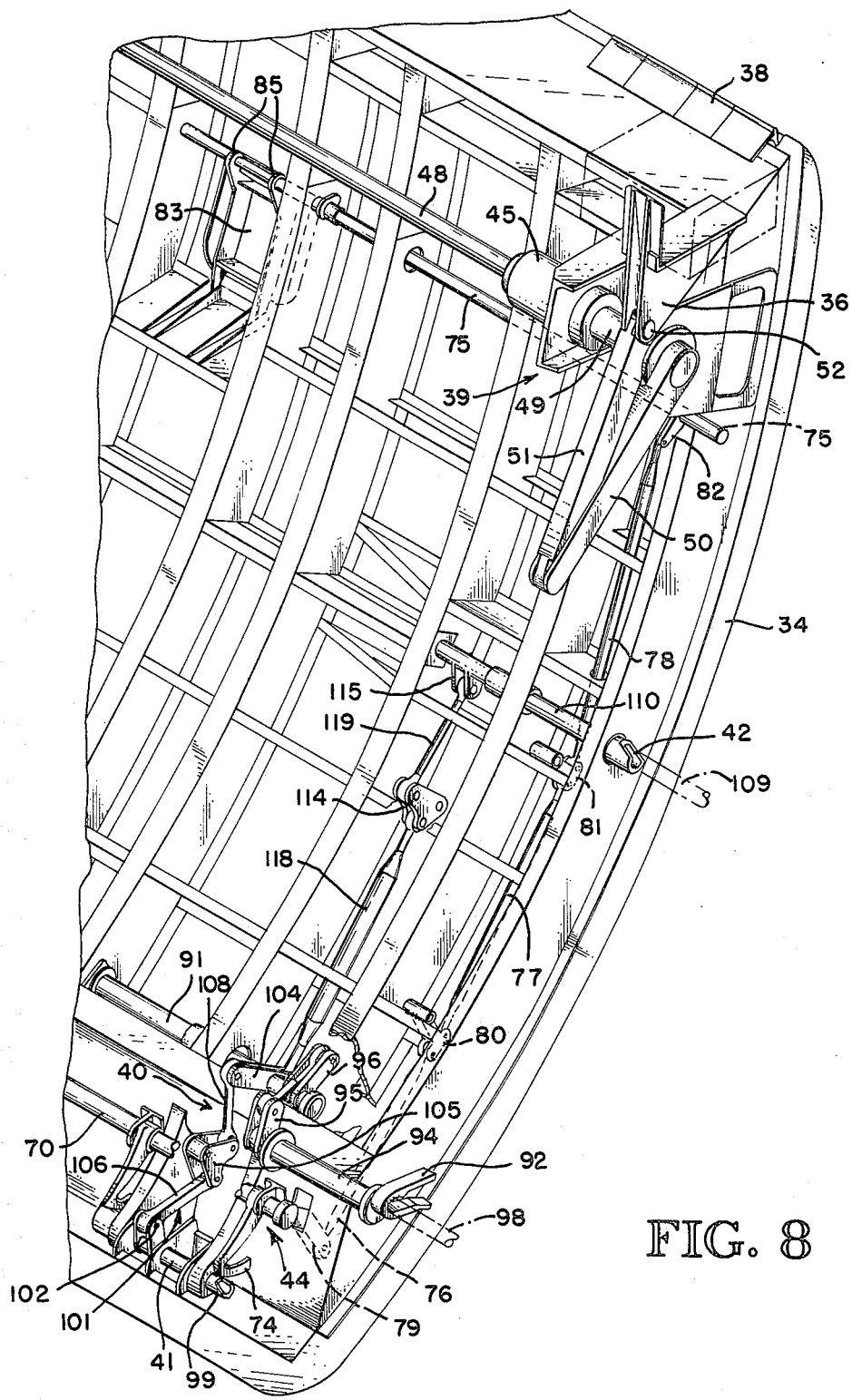
FIG. 8 is an enlarged fragmentary interior perspective view of the aft portion of an exemplary cargo door embodying features of the present invention, here illustrating details of the latch actuating and door pull-in/push-out mechanism, the latch/lock and vent door operating mechanism, and the hinge actuating mechanism.
Figure 21:
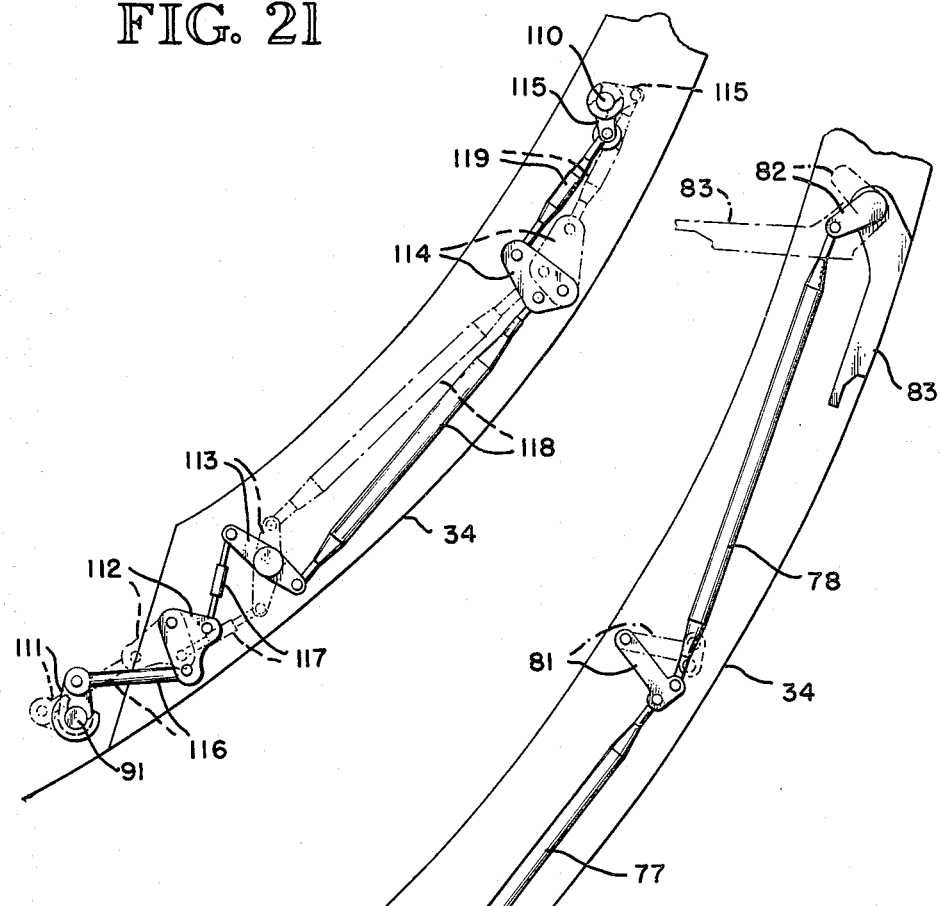
FIG. 21 is a sectional view taken substantially along the line 21—21 in FIG. 13, here illustrating that portion of the actuating mechanism for latching/unlatching the mid-span latches—i.e., the two mid-span latches respectively mounted on the fore and aft vertical edges of the cargo door and which are engageable with and disengageable from laterally projecting latch pins mounted on the fuselage body structure.
Figure 13:
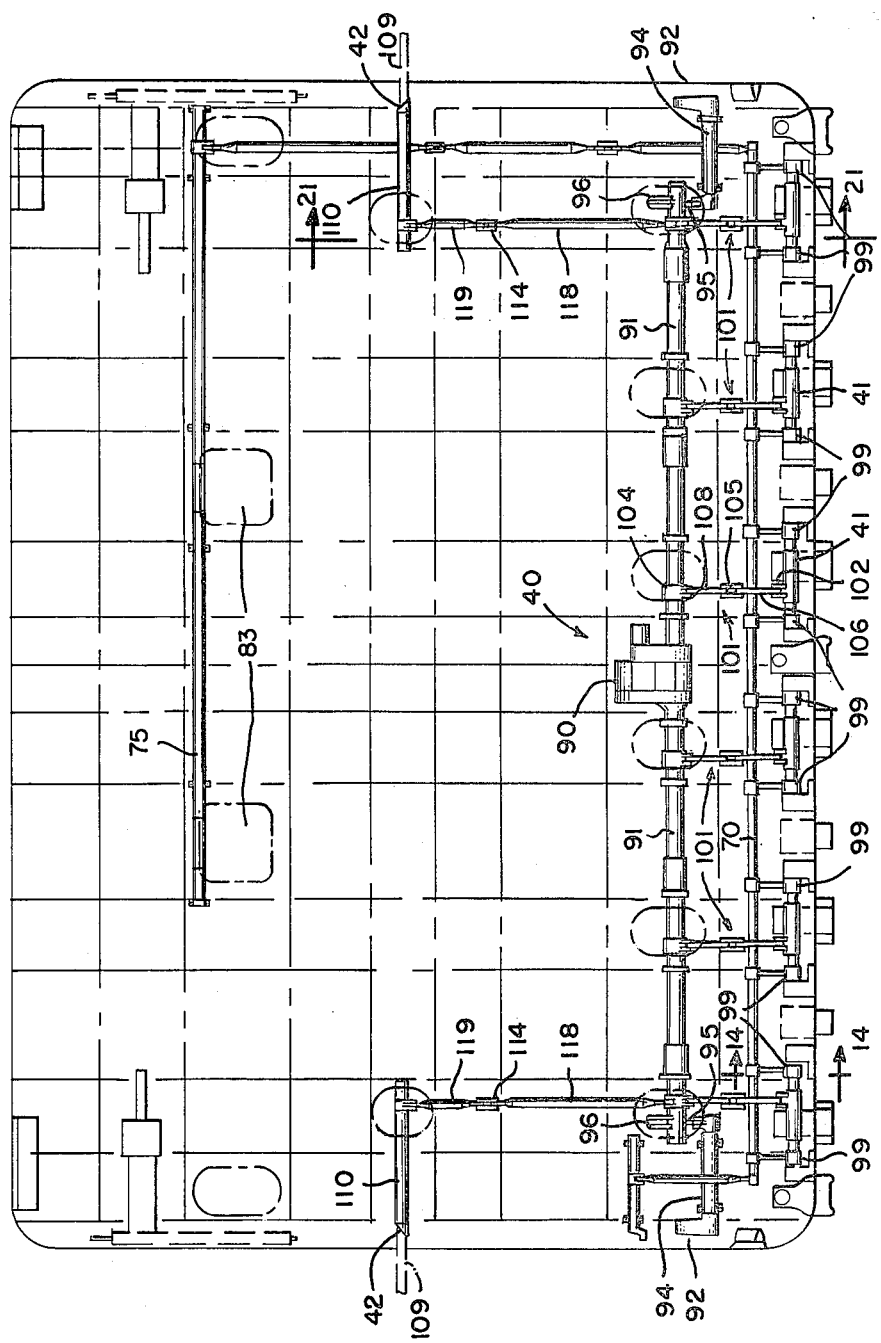
FIG. 13 is an interior elevational view of the cargo door of the present invention, here depicting the door in the closed position, again with parts removed for purposes of clarity, and illustrating particularly those portions of the actuating mechanisms employed to latch/unlatch the cargo door and to shift the door during the final increment of door closing movement and the initial increment of door opening movement.

To this end, and as best illustrated by reference to FIGS. 8, 10 and 13 conjointly, the latch and hook actuator 90 is drivingly coupled to a door-mounted transversely extending actuator torque tube 91 which is coupled at its fore and aft ends to a pair of fore and aft rotatable fishmouth-type pull-in/push-out door hooks 92 mounted on the lower vertical edges of the cargo door 34. As best shown in FIG. 8, the hooks 92 are mounted on and secured to one end of a door-mounted stub torque tube 94 which is, in turn, drivingly coupled at its opposite end to the actuator torque tube 91 by means of a crank 95 and drive link 96. Thus, the arrangement is such that when the actuator tube 91 is driven in, for example, a counterclockwise direction as viewed in FIG. 8, torque is transmitted via drive link 96 and crank 95 to the stub torque tube 94, thus rotating the pull-in/push-out hook 92 in a counterclockwise direction from the solid line "door closed" position shown in FIGS. 8 and 10 towards the phantom line "door open" position shown in FIG. 10. Conversely, when the latch and hook actuator 90 is energized to rotate the actuator torque tube 91 in a clockwise direction as viewed in FIG. 8, the pull-in/push-out hooks 92 are rotated through the phantom line "door open" position shown in FIG. 10 to the solid line "door closed" position shown in FIGS. 8 and 10. Such pull-in/push-out door-mounted hooks 92 are carried on the lower vertical edges of the cargo door 35 and positioned to engage and cooperate with rigid, fixedly mounted, laterally projecting pins 98 extending into the fuselage ingress/egress opening 35 from the aircraft body structure 36.

Thus, those skilled in the art will appreciate that when the system is being operated to open the cargo door 34 from a fully closed position, actuation of the appropriate external electrical "door unlatch/open" switch 62 serves to energize the electrically powered latch and hook actuator 90, imparting torque to actuator torque tube 91 and the stub torque tube 94 to rotate the hooks 92 from the solid line "door closed" position shown in FIGS. 8 and 10 counterclockwise to effectively push the door outwardly to the partially open position; and, at such time as the initial increment of door opening movement has progressed to a point where the door is fully unlatched and partially ajar, suitable limit switches (not shown) are engaged which serve to de-energize the latch and hook actuator 90 and energize the hinge actuating mechanisms 39 in the manner previously described, thereby permitting pivotal movement of the cargo door 34 to the fully opened position. Conversely, during door closure, when the cargo door 34 reaches the door partially ajar closed position, limit switches (not shown) are energized to de-energize the hinge actuating mechanisms 39 and energize the latch and hook actuator 90, thus rotating the pull-in/push-out hooks 92 in the opposite direction (i.e., clockwise as viewed in FIGS. 8 and 10) to cause the mutually engaged pull-in hooks 92 and body-mounted pins 98 to cooperate and effectively cam the door 34 into a fully closed position.

As previously indicated, the latch cam assembly 40 serves a second important function—viz., to latch and/or unlatch the cargo door 34 when it is in a fully closed position preparatory to locking of the door and/or opening of the door, respectively. To this end, and as best illustrated by reference to FIGS. 8 and 13-16 conjointly, it will be noted that the exemplary construction employs a plurality —e.g., six (6)—coaxial cam latch elements 41 each having a pair of open C-shaped cam latches 99 formed at its respective opposite ends, with all of such cam latch elements 41 being mounted coaxially along the lower edge of the door 34 with freedom for controlled rotation about their common axis. The cam latch elements 41 are so positioned in the cargo door 34 as to permit the twelve (12) open C-shaped cam latches 99 to engage with respective ones of twelve (12) sill-mounted fixed latch pins 100 which are dimensioned to fit into the respective C-shaped openings in the cam latches 99.

In order to rotate the cam latches 99 relative to the fixed latch pins 100 between a first position wherein the door 34 is fully latched and a second position wherein the door is fully unlatched, the six (6) cam latch elements 41 are coupled to the actuator torque tube 91 by respective ones of six (6) bellcrank assemblies, generally indicated at 101 and best illustrated in FIG. 8. Thus, each bellcrank assembly 101 includes a crank 102 integral with the cam latch element 41, a crank 104 integral with the actuator tube 91, an intermediate idler crank 105, and a pair of push rods 106, 108.

Referring next to FIG. 16, the relative positions of the fixed latch pins 100 and the C-shaped cam latches 99 are illustrated in a position where the door 34 is fully closed and fully unlatched. Thus, in this condition the door 34 and its rotatable open C-shaped cam latches 99 mounted thereon are free to pivot outwardly—i.e., to the right as viewed in FIG. 16—during door opening movement. To latch the door 34 and thus prevent opening thereof, torque is transmitted from the latch and hook actuator 90 and actuator torque tube 91 (FIG. 13) through the bellcrank assemblies 101 to rotate the cam latch cranks 102 in a clockwise direction as viewed in FIG. 16 from the fully unlatched position there shown to the fully latched position shown in FIG. 14; and, in this position, the stationary body-mounted latch pins 100 cooperate with the upwardly opened C-shaped cam latches 99 to prevent pivotal opening movement of the cargo door—i.e., movement to the right as viewed in FIG. 14.

Those skilled in the art will appreciate from the foregoing description that during a door unlatching operation, the actuator torque tube 91 is driven in the opposite direction to pivot the bellcranks 102 on the cam latch elements 41 in a counterclockwise direction as viewed in FIG. 14 from the position there shown to the fully unlatched position shown in FIG. 16, again permitting door opening movement. However, when the door and latch mechanisms are fully closed, latched and locked—i.e., the latch elements are in the position shown in FIGS. 8 and 14—the latch/lock segments 74 carried by the latch/lock torque tube 70 override the open ends of the upwardly facing C-shaped cam latches 99, thereby precluding rotation thereof and preventing disengagement of the latch pins 100 therefrom.

In carrying out this aspect of the invention, provision is also made for latching/unlatching the cargo door 34 at mid-span—i.e., at positions along the vertical door edges generally midway between the top and bottom of the door. To this end, and as best illustrated by reference to FIGS. 8, 13 and 21, conjointly, it will be noted that a pair of mid-span C-shaped cam latches 42 essentially identical to the latches 99 are provided projecting laterally from the vertical door edges and positioned to engage laterally projecting body-mounted latch pins 109 extending from the aircraft body structure 36 into the ingress/egress door opening 35. To actuate the rotatable cam latches 42, each latch is mounted on the outboard end of the torque tube 110 which is drivingly coupled to the actuator torque tube 91 by means of a plurality of door-mounted cranks—viz., crank 111 integral with the actuator torque tube 91, door-mounted cranks 112-114, and crank 115 integral with torque tube 110; and, a plurality of connecting rods 116-119. The arrangement is such that during actuation of the twelve (12) C-shaped cam latches 99 disposed along the bottom edges of the door 34, the mid-span latches 42 are simultaneously actuated to latch and/or unlatch the door at the mid-span location.

Door Centering Mechanism

Figure 22:
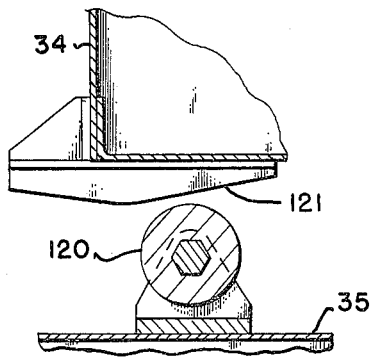
FIG. 22 is a fragmentary sectional view taken substantially along the line 22—22 in FIG. 3 illustrating particularly details of the door centering mechanism employed to insure proper centering of the cargo door in the fuselage opening and alignment of the door-mounted latching cams with the fuselage-mounted latching pins.

As previously indicated, loading of large capacity aircraft such as that shown in FIG. 1 at 25 can result in distortion of the body structural frame 36, thereby resulting in misalignment of the cargo door 34 and fuselage ingress/egress opening 35 with consequent misalignment of the latching components, thereby leading to jamming of the actuating mechanisms. To eliminate this problem, a pair of centering rollers are mounted on the lower vertical edges of the body structure 36 defining the fuselage ingress/egress opening 35, one of such rollers being illustrated at 120 in FIG. 22. The cargo door 34 is provided with a cooperable pair of ramp cams on its opposite vertical edges, one such ramp cam being indicated at 121 in FIG. 22. Thus, as the cargo door 34 moves toward and into the fuselage ingress/egress opening 35 during door closure—i.e., movement to the left as viewed in FIG. 22—the ramp cams 121 cooperate with the cam rollers 120 to cam the cargo door 34 laterally and thus compensate for distortion and insure proper alignment of the body-mounted latch pins 100, 109 and the C-shaped cam latches 99, 42, respectively.

Overall Cargo Door Operation

Referring now to FIGS. 3, 7-9 and 13 conjointly and sequentially with FIGS. 17-20, an overall operational cycle for unlocking, unlatching and opening a fully closed, latched and locked cargo door 34 will be described. Thus, at the outset, the lock/latch components will be in the position shown in solid lines in FIGS. 3, 7,

8 and 17—that is, the master latch/lock handle 57 (FIG. 7) will be stowed and latched in a flush position with respect to the aircraft fuselage outer skin surface; the carge door 34 will be fully closed; all C-shaped cam latches and body-mounted latch pins will be engaged; and, the lock segments 74 will be in the door locked position shown most clearly in FIG. 17, thereby preventing rotation of the latches 99 and unlatching of the door 34.

To initiate a door opening operation, the ground crew member 55 (FIG. 2) will first depress the handle release catch 58 (FIG. 7), thereby releasing the master latch/lock control handle 57 and permitting the bias forces established by the wound torsion springs 84 (FIG. 9): (i) to cause rotation of the vent door torque tube 75, thus opening the vent doors 83 and equalizing external and internal cabin pressure; (ii) through the interconnecting linkage, to cause rotation of the latch/lock torque tube 70, thus rotating the lock segments 74 from the locked position shown in FIG. 17 to the unlocked position shown in FIG. 18; and (iii), to thereafter permit pivotal movement of the master latch/lock control handle 57 from the solid line closed position shown in FIG. 7 to the phantom line opened position there shown, thus exposing and providing access to the electrical control switches 62.

The ground crew member 55 then actuates the appropriate one of the now-exposed switches 62 to initiate a door unlatching/opening cycle. Thus, when such switch is actuated, the latch and hook actuator 90 is energized and torque is transmitted to the actuator torque tube 91. Such action serves: (i) to rotate the C-shaped cam latches 99 from the fully latched position shown in FIG. 17 to the fully unlatched position shown in FIG. 18, thereby permitting movement of the cargo door 34 outwardly of the ingress/egress opening 35—i.e., to the right as viewed in the drawings; (ii) at the same time the mid-span latches 42 are rotated from the latched to the unlatched state; and iii), the pull-in/push-out hooks 92 are rotated from the door pull-in position shown in FIG. 17 in a counterclockwise direction as depicted in FIG. 18. Following unlatching of all C-shaped cam latches 42 and 99, continued rotation of the pull-in/push-out hooks 92 causes the hooks to rotate to the positions shown sequentially in FIGS. 19 and 20, at which point the cargo door 34 is fully unlatched, unlocked and partially ajar, defining a "X" (FIG. 20) between the bottom edge of the door 34 and the sill of the ingress/egress door opening 35 in the aircraft fuselage 29—such gap being on the order of 2.5 inches.

At this point, the initial incremental outward movement of the door 35 serves to actuate suitably located position sensors or limit switches (not shown), thus de-energizing the latch and hook actuator 90 and energizing the power drive unit 46 associated with the hinge actuating mechanisms 39. The cargo door 34 is not pivotally driven outwardly and upwardly about the piano-type hinge 38 from the solid line closed position shown in FIG. 5 to the phantom line open position there shown, at which point the overtravel stop limit switch 54 is actuated to de-energize the power drive unit 46. The cargo door 34 is now fully opened.

During a door closing cycle, the foregoing operational sequence is essentially reversed. Thus, when it is desired to close the cargo door 34, the ground crew member 55 (FIG. 2) will again actuate one of the exposed electrical control switches 62 (FIG. 7)—in this instance, the switch 62 which serves to initiate a door closing cycle by energizing the power drive unit 46 associated with the hinge actuating mechanism 39 to pivot the door downwardly and inwardly from the fully opened phantom line position shown in FIG. 5 to the substantially closed, but slightly ajar, position shown in FIG. 20. At this point, suitable position sensors or limits switches (not shown) are actuated by the cargo door 34 to de-energize the power drive unit 46 and energize the latch and hook actuator 90. Energization of the latch and hook actuator 90 serves to rotationally drive the actuator torque tube 91 in the opposite direction, thus causing the pull-in/push-out hooks 92 to commence rotation in a clockwise direction as viewed in FIGS. 18–20. During door closing, two sequential phases of hook/latch operation again occur—viz., initially, the C-shaped latch cams 42, 99 dwell in the unlatched position while the pull-in/push-out hooks 92 rotate from the position depicted in FIG. 20 to that depicted in FIG. 18, at which point the cargo door 34 is fully closed. Thereafter, continued rotation of the actuator torque shaft 91 rotates the C-shaped cam latches 99 from the unlatched position shown in FIG. 18 to the latched position shown in FIG. 17 (it will be understood by those skilled in the art that the lock segments 74 are still in the unlatched position shown in FIG. 18; and, of course, as the C-shaped cam latches 99 are rotated, so too are the mid-span latches 42). During movement of the cam latches form the position shown in FIG. 18 to that shown in FIG. 17, the pull-in hooks continue to rotate to the position shown in FIG. 17. The cargo door 34 is now fully closed and latched.

At this point, it is merely necessary for the ground crew member 55 (FIG. 2) to pivot the master latch/lock control handle 57 from the phantom line opened position shown in FIG. 7 to the solid line position there shown with the handle release catch 58 again serving to capture and latch the control handle 57 in its fully closed, aerodynamically flush, stowed position. During movement of the master latch/lock control handle 57 to the closed position, torque is transmitted to the latch/lock torque tube 70, thus shifting all of the locking segments 74 to the locked position shown in FIG. 17. Finally, torque is transmitted to the vent door torque tube 75, thus serving to close the vent doors 83 and rewind the torsion springs 84. Closure of the vent doors 83 permits pressurization of the internal cabin compartments.

Those skilled in the art will appreciate that in the event of any misalignment, malfunction or jamming, the vent doors 83 will be incapable of closure. Consequently, the ground crew member 55 will not be able to move the master latch/lock control handle 57 to the fully closed position and it will be impossible to pressurize the internal cabin compartments. Visual indicator lights and/or auditory alarms may be provided both at the master latch/lock control handle assembly 56 and in the cockpit for indicating such conditions; and, further, the presence of open vent doors 83 will be immediately evident to both the ground crew and to any personnel in the cargo hold.

Load Limiter Mechanism

To preclude the possibility of forcing the master latch/lock control handle 57 into a closed stowed position in the event of jamming or other malfunction of the various actuating mechanisms 39, 40 and 44 hereinabove described, a load limiting mechanism is incorporated in the master latch/lock control handle assembly 56. Thus, as best shown by reference to FIGS. 7, 23 and 24 conjointly, it will be noted that the control handle 57 is pivotally mounted at 61 to the fuselage body structure 36 (not shown in FIGS. 7, 23 or 24) by means of a bracket 125 and an integral crank or output arm 126 which is coupled directly to the connecting rod 63 FIGS. 3 and 9 which forms part of the latch/lock mechanism 44. As will be observed upon inspection of FIGS. 7 and 23, output arm 126 is provided with a detent-like notch 128 adapted to receive a roller 129 mounted on a roller link 130 which is, in turn, pivotally connected to bracket 126 at 131. A suitable torsion spring 132 (FIGS. 7, 23 and 24) is provided for normally biasing the roller 129 into the detent-like notch 128; and, in this position, the handle 57 may be freely pivoted through its entire range of operational motion assuming no jam or similar malfunction has been encountered. During such movement, the roller 129 simply moves with the output arm 126 as indicated in FIG. 7.

Figure 3:
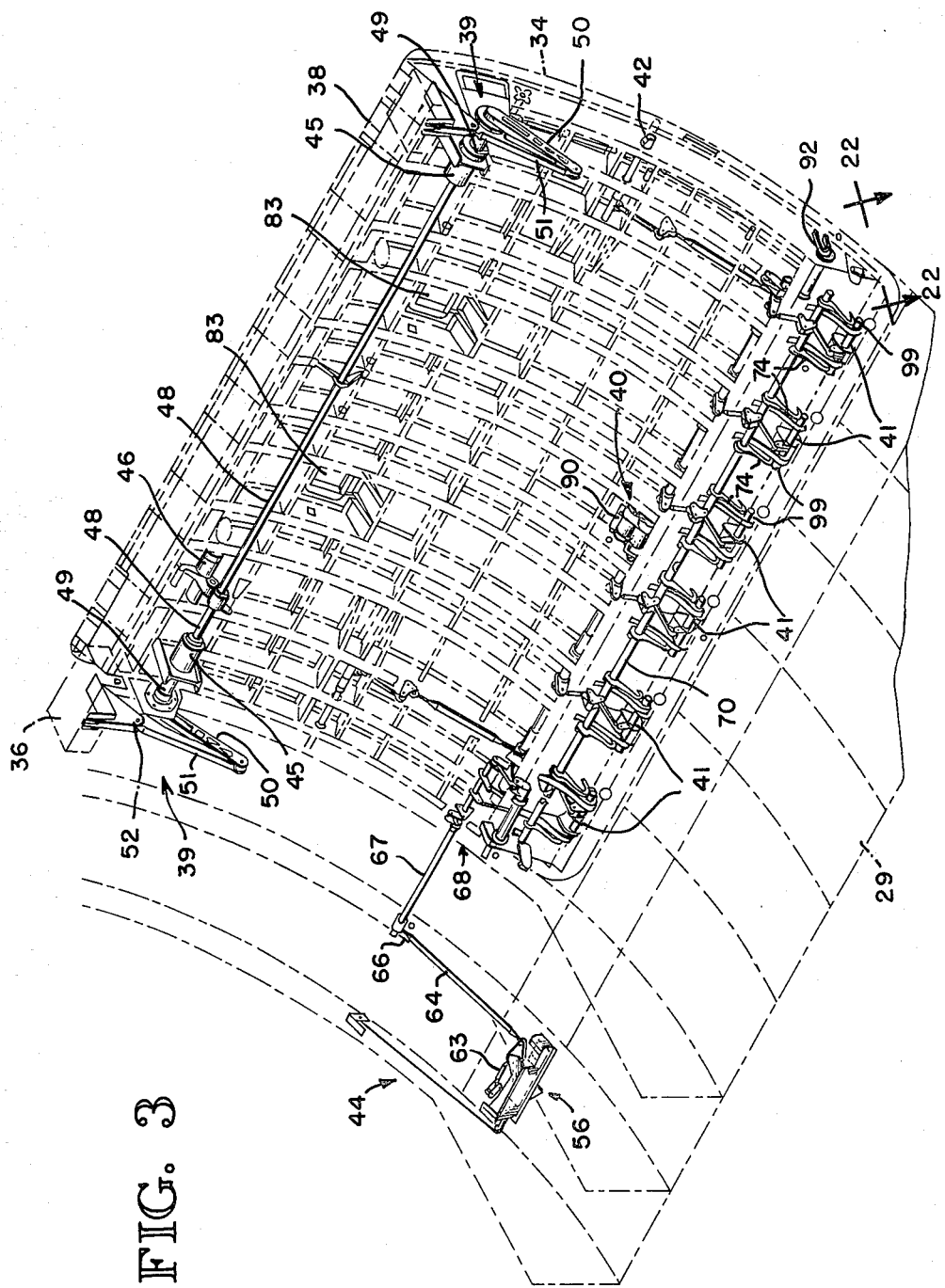
FIG. 3 is an interior perspective view of the cargo door of the present invention, here illustrating the door in the closed position and depicting, in rather generalized form, the various actuating mechanisms employed for latching/unlatching, locking/unlocking and closing/opening of the cargo door.
Figure 4:
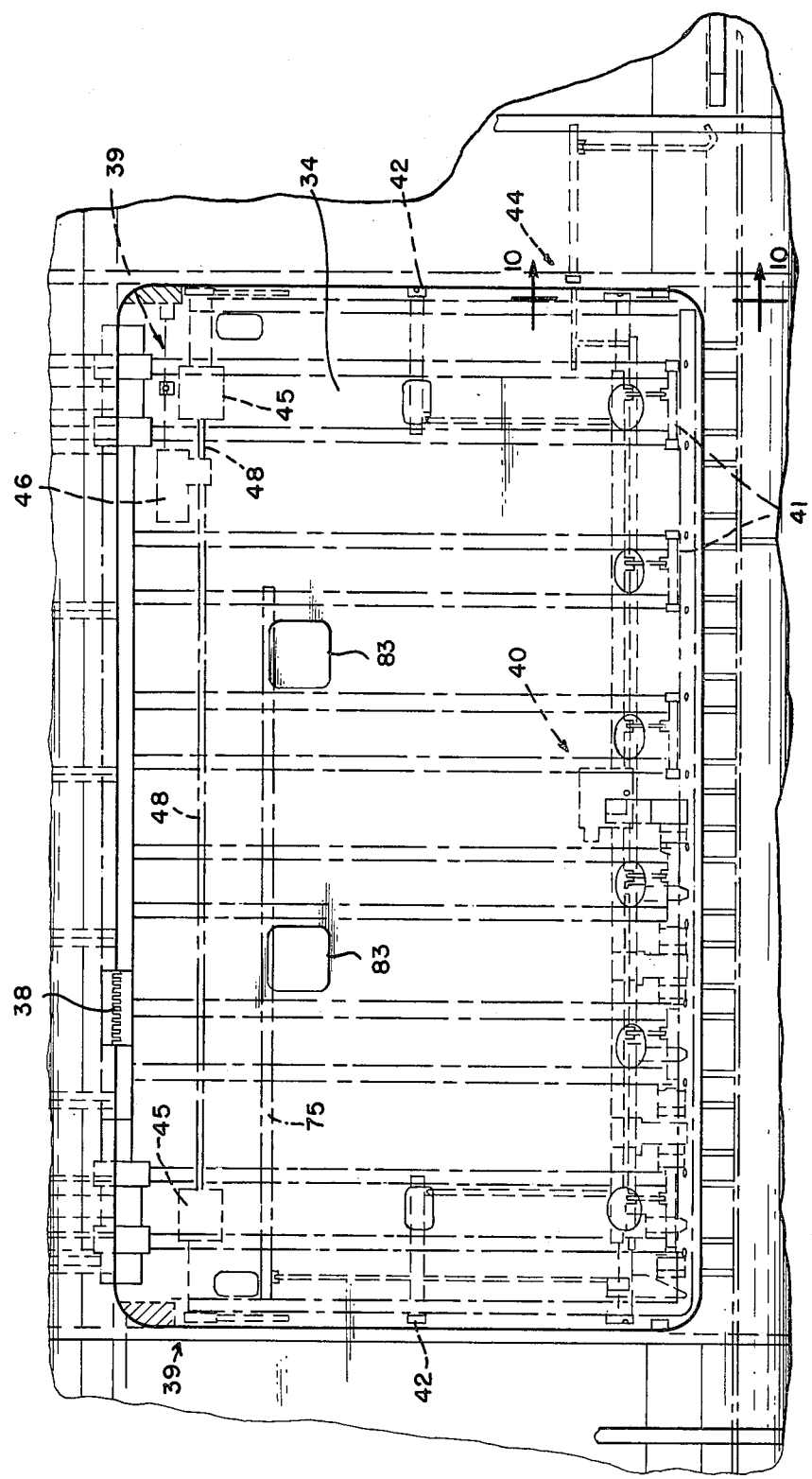
FIG. 4 is a right or starboard exterior elevational view of the cargo door of the present invention here depicting the door in the closed position and illustrating the general relative locations of the various actuating mechanisms mounted on the interior of the door and which are here shown in phantom lines.
Figure 23:
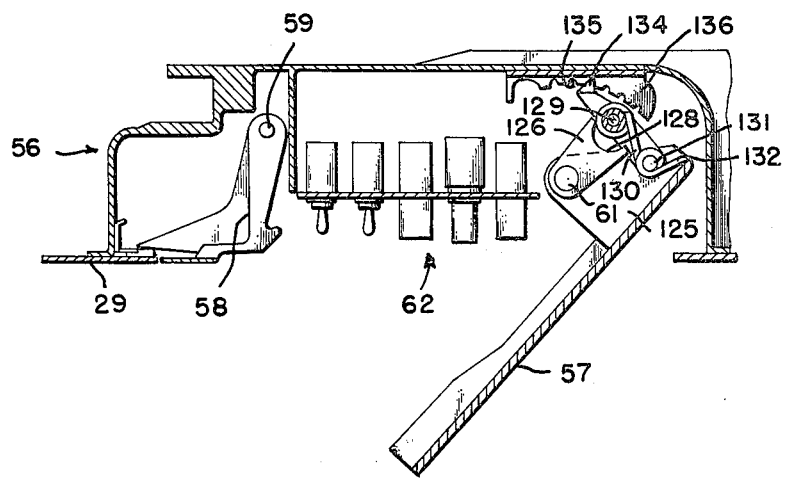
FIG. 23 is a sectional view of the fuselage-mounted master latch/lock control handle shown in FIG. 7, here illustrating the handle in the partially open position and depicting particularly details of a load limiter mechanism provided for preventing ground personnel from forcing the control handle into a fully closed position in those instances where some malfunction has occurred which prevents movement of the latch/lock elements into a fully closed door latched and locked position; and, FIG. 24 is a sectional view taken substantially along the line 24—24 in FIG. 7.
Figure 24:
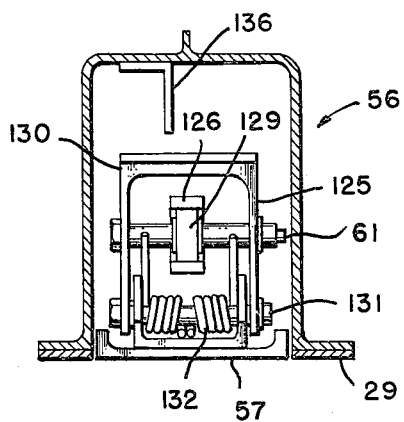

However, when a jam or similar malfunction occurs, push rod 63 FIGS. 3 and 9 and, is precluded from moving and, consequently, the output arm 126 is inhibited from freely rotating about its pivot axis 61. Under these conditions, should the ground crew member attempt to force the control handle 57 to the closed position, roller link 130 is pivoted about its pivot axis 131 as indicated in FIG. 23, thus causing the roller 129 to move out of the detent-like notch 128 and engaging a detent tooth 134 on the free end of link 130 with one of a plurality of detent notches 135 formed on a handle brake sector 136. As a consequence, the ground crew member cannot force the handle 57 to the closed position until such time as the jam is cleared and the roller 129 is permitted to move back into the detent notch 128 by forces exerted by the torsion spring 132.

SUMMARY

Thus, those skilled in the art will appreciate that there has herein been disclosed a highly effective and reliable outwardly opening canopy-type door or closure member 34 suitable for use in closing, for example, fuselage ingress/egress openings 35 associated with the cargo holds of aircraft 25. Because of the synergistic interaction between the latch/lock mechanism 44, the latch control assembly 40, and the hinge actuating mechanism 39, the actuating linkaages are highly effective for actuating closure doors irrespective of the size thereof. Moreover, the system is essentially fail-safe.

Those skilled in the art will further appreciate that while the exemplary form of the invention here illustrated and described contemplates electrical power actuation for the latch cam assembly 40 and the hinge actuating mechanism 39, it would be within the scope of the invention to employ other types of prime moving systems. Indeed, while not illustrated and described in detail herein, provision can readily be made for manually cranking the power drive actuator 46 and/or the latch and hook actuator 90 so as to permit opening and closing of the cargo door 34 on a completely manual basis in the event of an electrical malfunction. Moreover, while not described or illustrated herein, suitable control switches can be provided on the interior of the aircraft fuselage 29 for permitting opening/closing, unlatching/latching and/or unlocking/locking of the cargo door from the interior of the aircraft.

We claim as our invention:

1. In combination with an aircraft fuselage structural frame defining an ingress/egress opening extending therethrough, a closure assembly comprising:
   (a) an outwardly opening, canopy-type door having parallel vertical side edges, parallel top and bottom edges, and dimensioned to fit into and close said opening;
   (b) hinge defining means secured to said frame along the upper edge of said opening and to said door top edge;
   (c) hinge actuating means mounted on said door and coupled to said frame for pivoting said door about said hinge defining means between a first fully open position defining an unobstructed clearance space having a width and height substantially coextensive with said opening, and a second substantially closed position wherein said door is slightly ajar;
   (d) a latch cam mechanism mounted on said door including latch cam means separably engageable with said frame, door pull-in means separably engageable with said frame for pulling said door into a fully closed position during the final increment of door closing movement, and a single power driven actuator for sequentially activating said door pull-in means and said latch cam means so as to cause said latch cam means to dwell in the unlatched state when said pull-in means is activated to fully close said door and for thereafter activating said latch cam means to latch said door in a closed position;
   (e) a latch/lock mechanism mounted on said door including a plurality of lock segments selectively moveable into and out of the path of movement of at least certain of said latch cam means for preventing unlatching movement thereof when said door is locked;
   (f) a master latch/lock control mechanism mounted on said fuselage at a position accessible to ground personnel externally of said aircraft, said master latch/lock control mechanism including a control handle and means for separably interconnecting said handle with said latch/lock means so that said lock segments may be manually and mechanically shifted between locked and unlocked positions by said ground personnel from the exterior of said aircraft; and,
   (g) actuating switches operably coupled to said hinge actuating means and said power driven actuator, said switches being mounted in said master latch/lock control mechanism in a position accessible to ground personnel only when said handle is manually shifted to the unlocked position so as to permit remote activation of said power driven actuator and said hinge actuating means in sequential order during opening movement of said door and remote activation of said hinge actuating means and said power driven actuator in sequential order during closing movement of said door.

2. The combination as set forth in claim 1 wherein said hinge actuating means and said power driven actuator are electrically powered.

3. The combination as set forth in claim 1 wherein said latch cam means includes a plurality of coaxial rotatable C-shaped latch cams mounted on said door adjacent said door bottom edge and latchably engageable with a corresponding plurality of coaxial latch pins mounted on said frame adjacent the lower edge of said ingress/egress opening, and wherein said power driven actuator is drivingly coupled to said C-shaped latch cams for rotating said cams about their common axis between a first unlatched position wherein said cams are free to pivot towards and away from said pins during pivotal door closing and opening movement and a second latched postion partially surrounding said pins for precluding pivotal movement of said cams and said door outwardly with respect to said pins.

4. The combination as set forth in claim 3 wherein said latch cam means includes at least one pair of mid-span C-shaped latch cams mounted on the fore and aft vertical edges of said door and latchably engageable with respective ones of a pair of latch pins mounted on said frame adjacent the fore and aft vertical edges of said ingress/egress opening, said mid-span C-shaped latches being drivingly coupled to said power driven actuator for simultaneous actuation with said plurality of coaxial C-shaped latch cams.

5. The combination as set forth in claim 1 wherein said hinge actuating means includes first and second rotary actuators, a power drive unit for activating said actuators, output torque tubes drivingly engaged with said actuators, a pair of drive links drivingly coupled to said output torque tubes, and a pair of links pivotally coupled to said frame and to respective ones of said drive links, whereby upon pivotal movement of said door to its fully opened position, said ingress/egress opening is substantially unobstructed by said hinge actuating means.

6. The combination as set forth in claim 5 wherein said door is a cargo door and said ingress/egress opening defines an unobstructed off-loading/on-loading clearance area on the order of 134 inches wide and 69 inches high.

7. The combination as set forth in claim 1 wherein said master latch/lock control mechanism includes load limiting means for precluding manual shifting of said handle to said fully closed locked position whenever said door is not fully closed and latched.

8. In combination with an aircraft fuselage structural frame defining an ingress/egress opening extending therethrough, a canopy-type door having a pair of parallel vertical side edges and parallel top and bottom edges, said door being hingedly connected along its top edge to said frame for opening and closing said ingress/egress opening, hinge actuating means for shifting said door between a first fully open position and a second substantially closed position wherein said door is slightly ajar, and locking means for selectively locking said door in a fully closed position, an improved power driven latch cam mechanism for shifting said door between a fully closed position and said second substantially closed position and for selectively latching/unlatching said door comprising:

(a) latch cam means mounted on said door, said latch cam means being separably engageable with said frame for selectively latching and unlatching said door when said door is in a fully closed position;

(b) door pull-in means mounted on said door and separably engageable with said frame for shifting said door between said second position and a fully closed position;

(c) a single power driven actuator mounted on said door for sequentially activating said door pull-in means and said latch cam means so as to cause said latch cam means to dwell in the unlatched state when said pull-in means are activated to fully close said door and for thereafter activating said latch cam means to latch said door in a closed position; and, (d) means for activating said power driven actuator and said hinge actuating means in sequential order during opening movement of said door and activating said hinge actuating means and said power driven actuator in sequential order during closing movement of said door.

9. The combination as set forth in claim 8 wherein said hinge actuating means and said power driven actuator are electrically powered.

10. The combination as set forth in claim 8 wherein said latch cam means includes a plurality of coaxial rotatable C-shaped latch cams mounted on said door adjacent said door bottom edge and latchably engageable with a corresponding plurality of coaxial latch pins mounted on said frame adjacent the lower edge of said ingress/egress opening, and wherein said power driven actuator is drivingly coupled to said C-shaped latch cams for rotating said cams about their common axis between a first unlatched position wherein said cams are free to pivot towards and away from said pins during pivotal door closing and opening movement and a second latched position partially surrounding said pins for precluding pivotal movement of said cams and said door outwardly with respect to said pins.

11. The combination as set forth in claim 10 wherein said latch cam means includes at least one pair of mid-span C-shaped latch cams mounted on the fore and aft vertical edges of said door and latchably engageable with respective ones of a pair of latch pins mounted on said frame adjacent the fore and aft vertical edges of said ingress/egress opening, said mid-span C-shaped latches being drivingly coupled to said power driven actuator for simultaneous actuation with said plurality of coaxial C-shaped latch cams.

12. In combination with an aircraft fuselage structural frame defining an ingress/egress opening extending therethrough, a canopy-type door hingedly connected to said frame for opening and closing said ingress/egress opening, hinge actuating means mounted on said door and coupled to said frame for shifting said door between a first fully open position and a second substantially closed position wherein said door is slightly ajar, a latch cam mechanism for shifting said door between said second substantially closed position and a fully closed position and for selectively latching and unlatching said door with respect to said frame when said door is in a fully closed position, and a latch/lock mechanism mounted on said door and including a plurality of lock segments controllably moveable between a first lock position precluding activation of said latch cam mechanism and a second unlock position permitting activation of said latch cam mechanism, an improved remotely operable master latch/lock control mechanism mounted on said fuselage structural frame at a point accessible to ground personnel exterior of said aircraft and comprising:

(a) a master latch/lock control handle pivotally mounted on said frame for manual movement between a first closed position flush with said fuselage and defining an aerodynamically smooth uninterrupted skin surface and a second open position projecting outwardly from said frame;

(b) means for mechanically coupling said handle to said master latch/lock mechanism when said door is in a fully closed position for shifting said lock segments between said first lock position when said handle is in said first closed position and said second unlock position when said handle is in said second open position; and, (c) actuating switch means operably coupled to said hinge actuating means and said latch cam mechanism, said switch means being mounted in said master latch/lock control mechanism in a position accessible to ground personnel only when said handle is manually shifted to said second open position so as to permit remote activation of said master latch/lock control mechanism and said hinge actuating means in sequential order during opening movement of said door and remote activation of said hinge actuating means and said master latch/lock control mechanism in sequential order during closing movement of said door.

13. The combination as set forth in claim 12 further comprising vent door means mounted in said canopy-type door for permitting pressurization of the interior of said aircraft when said canopy-type door is fully closed and latched and for equalizing external and internal pressure prior to opening of said canopy-type door, means for normally biasing said vent door means to the open position, means for mechanically coupling said vent door means to said latch/lock mechanism and to said handle for normally biasing said handle to the open position; and, means for releasably latching said handle in said first closed position with said vent door means held in a closed position against the biasing force tending to shift said vent door means to the open position so that when said handle is released from its latched first closed position said vent door biasing means serves to shift said lock segments to said second unlock position and to pivot said handle to said second open position.

14. The combination as set forth in claim 13 further including second means for normally biasing said vent door means to the closed position for permitting automatic opening of said vent door means against the biasing force imposed by said second biasing means when said door is fully closed and locked and negative pressure conditions exist within said aircraft.

15. The combination as set forth in claims 12, 13 or 14 wherein said master latch/lock control mechanism includes load limiting means for precluding manual shifting of said handle to said fully closed locked position whenever said door is not fully closed and latched.

* * * * *